(12) United States Patent
Sadeghi et al.

(10) Patent No.: US 10,075,992 B2
(45) Date of Patent: Sep. 11, 2018

(54) TECHNIQUES TO ENABLE WI-FI DIRECT SERVICES APPLICATION SERVICE PLATFORM CAPABILITY NEGOTIATION

(71) Applicant: INTEL IP CORPORATION, Santa Clara, CA (US)

(72) Inventors: Bahareh Sadeghi, Portland, OR (US); Venkata Vallabhu, Portland, OR (US); Emily Qi, Gig Harbor, WA (US)

(73) Assignee: INTEL IP CORPORATION, Santa Clara, CA (US)

( * ) Notice: Subject to any disclaimer, the term of this patent is extended or adjusted under 35 U.S.C. 154(b) by 79 days.

(21) Appl. No.: 15/120,994

(22) PCT Filed: Sep. 26, 2014

(86) PCT No.: PCT/US2014/057901
§ 371 (c)(1),
(2) Date: Aug. 23, 2016

(87) PCT Pub. No.: WO2015/130343
PCT Pub. Date: Sep. 3, 2015

(65) Prior Publication Data
US 2016/0366718 A1    Dec. 15, 2016

Related U.S. Application Data

(60) Provisional application No. 61/945,749, filed on Feb. 27, 2014.

(51) Int. Cl.
*H04W 4/00* (2018.01)
*H04W 76/14* (2018.01)
(Continued)

(52) U.S. Cl.
CPC ............ *H04W 76/14* (2018.02); *H04L 67/16* (2013.01); *H04L 67/303* (2013.01);
(Continued)

(58) Field of Classification Search
CPC ... H04W 76/023; H04W 76/06; H04W 8/005; H04W 48/16; H04W 4/005; H04W 92/18; H04L 67/303; H04L 67/16
See application file for complete search history.

(56) References Cited

U.S. PATENT DOCUMENTS

2012/0265913 A1   10/2012   Suumaki et al.
2013/0044635 A1   2/2013   Suzuki
(Continued)

OTHER PUBLICATIONS

International Search Report in International Patent Application No. PCT/US2014/057901 dated Dec. 29, 2014.

*Primary Examiner* — Afshawn M Towfighi

(57) ABSTRACT

Techniques to enable Wi-Fi Direct Services (WFDS) application service platform (ASP) capability negotiation are described. In one embodiment, for example, an apparatus may comprise logic, at least a portion of which is in hardware, the logic to send a probe request message for a service seeker and receive a probe response message in response to the probe request message, the probe response message to identify an advertised service and comprise a WFDS ASP capability attribute, the logic to determine whether to use a WFDS ASP connection setup procedure to establish a connection with an advertiser of the advertised service, based on the WFDS ASP capability attribute. Other embodiments are described and claimed.

25 Claims, 10 Drawing Sheets

(51) Int. Cl.
*H04W 4/70* (2018.01)
*H04W 76/30* (2018.01)
*H04W 76/02* (2009.01)
*H04L 29/08* (2006.01)
*H04W 8/00* (2009.01)
*H04W 48/16* (2009.01)
*H04W 76/06* (2009.01)
*H04W 92/18* (2009.01)

(52) U.S. Cl.
CPC ............ *H04W 4/005* (2013.01); *H04W 4/70* (2018.02); *H04W 8/005* (2013.01); *H04W 48/16* (2013.01); *H04W 76/023* (2013.01); *H04W 76/06* (2013.01); *H04W 76/30* (2018.02); *H04W 92/18* (2013.01)

(56) References Cited

U.S. PATENT DOCUMENTS

| | | |
|---|---|---|
| 2013/0282914 A1 | 10/2013 | Jeong et al. |
| 2013/0346553 A1 | 12/2013 | Shin et al. |
| 2014/0010220 A1 | 1/2014 | Huang |
| 2014/0337544 A1* | 11/2014 | Huang .................. G06F 13/385 710/63 |
| 2015/0173001 A1* | 6/2015 | Huang .................... H04L 67/16 370/254 |

* cited by examiner

*FIG. 2*

| Attribute ID 202 | Length 204 | WFDS ASP Capability 206 |
|---|---|---|

200

*Octets:* 1     2     1

_Storage Medium 600_

*Computer-Executable Instructions*
*602*

TECHNIQUES TO ENABLE WI-FI DIRECT SERVICES APPLICATION SERVICE PLATFORM CAPABILITY NEGOTIATION

RELATED CASE

This application claims priority to U.S. Provisional Patent Application No. 61/945,749, filed Feb. 27, 2014, the entirety of which is hereby incorporated by reference.

TECHNICAL FIELD

Embodiments described herein generally relate to wireless communications.

BACKGROUND

The Wi-Fi Alliance (WFA) Wi-Fi Direct standard, released in 2010, enables peer-to-peer (P2P) link-layer connectivity between wireless communications devices. In order to provide mechanisms for device and service discovery, connection management, and session management in conjunction with implementation of Wi-Fi Direct, the Wi-Fi Direct Services (WFDS) specification has been developed by the WFA WFDS task group. One component of the WFDS specification is the WFDS application service platform (ASP). The WFDS ASP is a logical entity that implements common functions and protocol elements to support service interoperability and discovery operations, device discovery operations, connection management operations, and/or session management operations. One protocol comprised in the WFDS ASP is the ASP coordination protocol (ASP-CP). The ASP-CP is a protocol that allows peer ASP entities to manage ASP sessions.

Recently, the ASP-CP has begun to be used in conjunction with other service specifications, such as the Wi-Fi Serial Bus (WSB) specification. In some cases, it may not necessarily be desirable that WSB devices or other devices that utilize the ASP-CP actually use the WFDS ASP for particular procedures such as connection setup, session setup, and/or session teardown. For example, WFDS ASP session setup and teardown typically benefit services that communicate via internet protocol (IP), and may not significantly benefit services that communicate via media access control (MAC) protocol. Since WSB services communicate via MAC, it may be preferable for WSB devices to forgo WFDS ASP session setup and teardown. Techniques to enable WFDS ASP capability negotiation may be desirable in order to provide such flexibility.

BRIEF DESCRIPTION OF THE DRAWINGS

FIG. 2 illustrates an embodiment of an attribute format.

FIG. 6 illustrates an embodiment of a storage medium.

DETAILED DESCRIPTION

Figure 1:
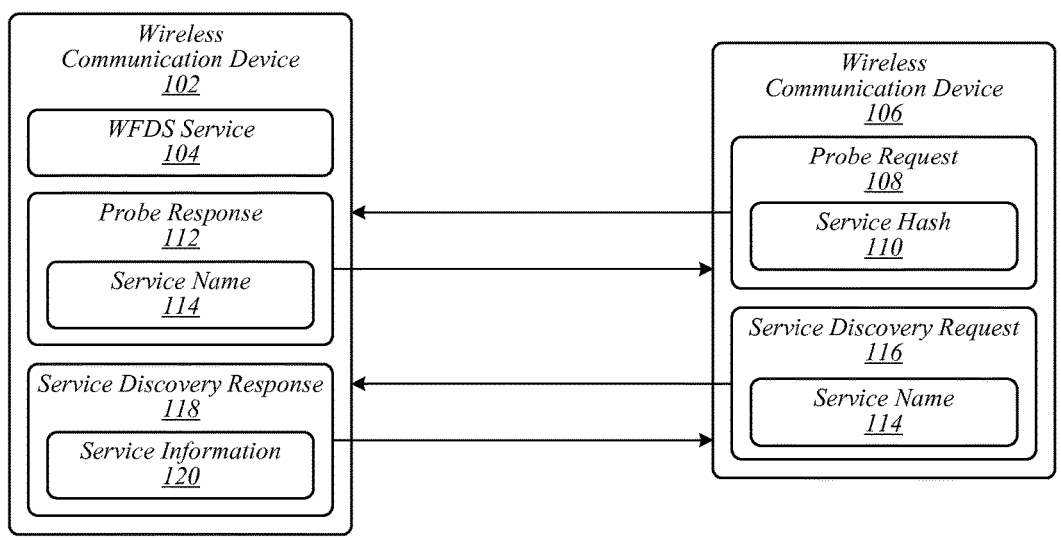
FIG. 1 illustrates an embodiment of an operating environment.

Disclosed herein are techniques to enable WFDS ASP capability negotiation, such as may be implemented in order to enable devices that utilize the ASP-CP to appropriately specify the WFDS ASP procedures that they may perform. According to such techniques, devices may negotiate WFDS ASP capabilities during service discovery. More particularly, devices may exchange WFDS ASP capability information by including WFDS ASP capability attributes within Probe Request and Probe Response messages that the devices exchange during service discovery.

In one embodiment, for example, an apparatus may comprise logic, at least a portion of which is in hardware, the logic to send a probe request message for a service seeker and receive a probe response message in response to the probe request message, the probe response message to identify an advertised service and comprise a WFDS ASP capability attribute, the logic to determine whether to use a WFDS ASP connection setup procedure to establish a connection with an advertiser of the advertised service, based on the WFDS ASP capability attribute. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Embodiments herein are generally directed to wireless communications. Some embodiments are particularly directed to wireless communications according to one or more Wi-Fi Alliance (WFA) standards. In various embodiments, for example, devices may wirelessly communicate according to the WFA Wi-Fi Direct standard, 2010 Release. Some embodiments may additionally or alternatively involve wireless device operation and/or communication using interfaces, protocols, and/or standards developed by the WFA Wi-Fi Direct Services (WFDS) Task Group. In various embodiments, for example, devices may operate and/or communicate using functions and/or protocol elements of the WFDS application service platform (ASP). The embodiments are not limited in this context.

This disclosure is not limited to Wi-Fi Direct related standards, but may also apply to wireless local area networks (WLANs), such as WLANs implementing one or more Institute of Electrical and Electronics Engineers (IEEE) 802.11 standards (sometimes collectively referred to as "Wi-Fi"). This disclosure may also apply to wireless wide area networks (WWANs), wireless personal area networks (WPANs), and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants.

Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1× RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

FIG. 1 illustrates an operating environment 100 such as may be representative of various embodiments. In operating environment 100, a wireless communication device 102 offers a WFDS service 104 for use by other devices. In conjunction with a service discovery procedure for discovering services offered by wireless communication device 102, a wireless communication device 106 sends a probe request 108 to wireless communication device 102. Wireless communication device 102 performs a hash matching process based on a service hash 110 comprised in probe request 108, and identifies a service name 114 corresponding to WFDS service 104 via the hash matching process. Wireless communication device 102 then sends a probe response 112 that comprises the service name 114. In order to obtain information regarding WFDS service 104, wireless communication device 106 sends a service discovery request 116 that comprises the service name 114 corresponding to WFDS service 104. In response, wireless communication device 102 sends a service discovery response 118 comprising service information 120 for WFDS service 104.

Based on service information 120, wireless communication device 106 may determine whether or not to use WFDS service 104. If wireless communication device 106 determines to use WFDS service 104, it may then initiate procedures to establish a connection with wireless communication device 102 and obtain WFDS service 104 from wireless communication device 102. The procedures that wireless communication device 106 should initiate may depend on the capabilities of wireless communication device 102 and wireless communication device 106. For example, if wireless communication devices 102 and 106 are both capable of a WFDS ASP connection setup procedure, it may be desirable that a connection between wireless communication devices 102 and 106 be established via such a procedure. On the other hand, if one or both of wireless communication devices 102 and 106 are incapable of the WFDS ASP connection setup procedure, it may be desirable that the connection between wireless communication devices 102 and 106 be established via a Wi-Fi Direct (P2P) connection setup procedure. However, according to conventional techniques, wireless communication devices 102 and 106 may be unaware of each other's WFDS ASP capabilities upon conclusion of service discovery.

Disclosed herein are techniques to enable WFDS ASP capability negotiation. According to various such techniques, devices may negotiate WFDS ASP capabilities during service discovery. More particularly, in some embodiments, devices may exchange WFDS ASP capability information by including WFDS ASP capability attributes within probe request and probe response messages that they exchange during service discovery.

FIG. 2 illustrates a WFDS ASP capability attribute 200 that a device may generate during service discovery. For example, wireless communication device 106 of FIG. 1 may include WFDS ASP capability attribute 200 in probe request 108. In another example, wireless communication device 106 of FIG. 1 may include WFDS ASP capability attribute 200 in probe response 112. The embodiments are not limited to these examples.

As shown in FIG. 2, WFDS ASP capability attribute 200 may comprise an attribute ID field 202, a length field 204, and a WFDS ASP capability field 206. In various embodiments, the attribute ID field 202 may comprise 1 octet, the length field 204 may comprise 2 octets, and the WFDS ASP capability field 206 may comprise 1 octet. In some embodiments, attribute ID field 202 may comprise a value indicating that the attribute is a WFDS ASP capability attribute.

In various embodiments, attribute ID field 202 may comprise a value of 30. In some embodiments, length field 204 may comprise a value indicating a length of the subsequent fields of the connection capability attribute 200. In various embodiments, length field 204 may comprise a value of 1. In some embodiments, WFDS ASP capability field 206 may comprise a set of bits describing WFDS ASP capabilities of the device that generates the WFDS ASP capability attribute 200. In various embodiments, a bit within WFDS ASP capability field 206 may comprise a value indicating whether the device supports connection setup according to WFDS 1.0 or instead only supports P2P connection setup. In some embodiments, a bit within WFDS ASP capability field 206 may comprise a value indicating whether the device supports session setup and teardown according to WFDS 1.0. In various embodiments, WFDS ASP capability field 206 may comprise one or more reserved bits. The embodiments are not limited in this context.

Figure 3:
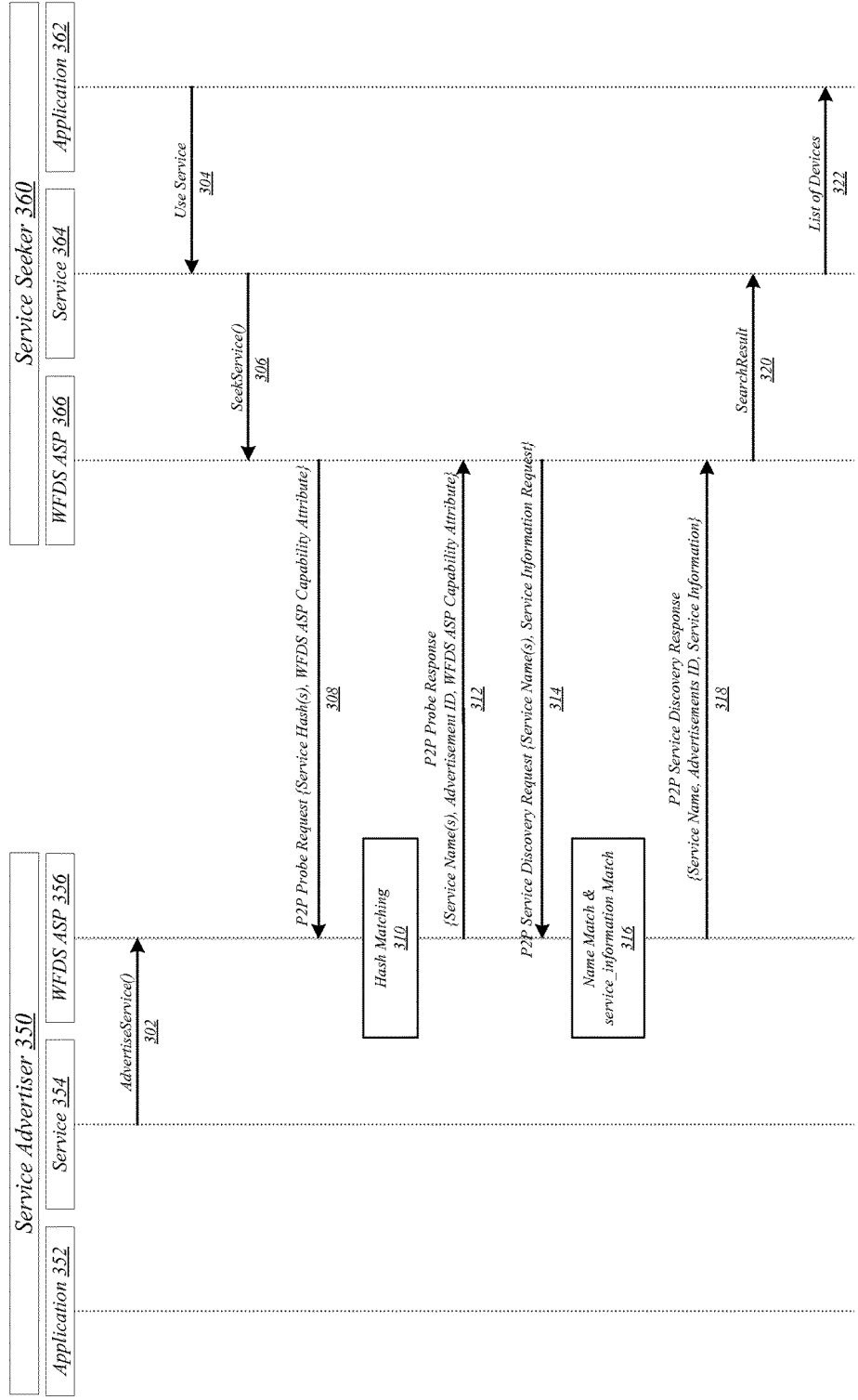
FIG. 3 illustrates an embodiment of a first communications flow.

FIG. 3 illustrates a communications flow 300 that may be representative of a service discovery procedure such as may be performed in various embodiments. More particularly, communications flow 300 may be representative of a service discovery procedure during which WFDS ASP capability negotiation is performed. In communications flow 300, communications are exchanged between a service advertiser 350 and a service seeker 360. In various embodiments, service advertiser 350 may comprise a wireless communication device that offers a WFDS service for use by other devices. For example, service advertiser 350 may be representative of wireless communication device 102 of FIG. 1 in some embodiments. In various embodiments, service seeker 360 may comprise a wireless communication device that initiates a service discovery procedure to discover services offered by service advertiser 350. For example, service seeker 360 may be representative of wireless communication device 106 of FIG. 1 in some embodiments. The embodiments are not limited in this context.

Service advertiser 350 (hereinafter, "advertiser 350") comprises several logical modules. Advertiser 350 comprises a service module 354, which may comprise programming, functions, logic, parameters, and/or other information operative to implement particular capabilities for advertiser 350. Advertiser 350 also comprises an application module 352, which may comprise programming, functions, logic, parameters, and/or other information embodying an application that is to utilize capabilities implemented by service module 354. Advertiser 350 also comprises a WFDS ASP module 356, which may comprise programming, functions, logic, parameters, and/or other information operative to implement a WFDS ASP from which service module 354 may obtain ASP primitives and/or events. Similarly, the service seeker 360 (hereinafter, "seeker 360") comprises an application module 362, a service module 364, and a WFDS ASP module 366, each of which may be the same as or similar to its counterpart within advertiser 350. The embodiments are not limited in this context.

Communications flow 300 may begin at 302, where service module 354 may send an AdvertiseService( ) command to WFDS ASP module 356, indicating that services are to be advertised on behalf of advertiser 350. At 304, application module 362 may send a Use Service instruction 304 to service module 364 indicating the desire to locate a service for use by seeker 360. In response to the Use Service instruction 304, service module 364 may send a SeekService( ) command to WFDS ASP module 366 at 306. The SeekService( ) command may indicate that services are to be sought on behalf of seeker 360. The embodiments are not limited in this context.

At 308, WFDS ASP module 366 may send a P2P Probe Request to WFDS ASP module 356. The P2P Probe Request may contain one or more service hashes. The P2P Probe Request may also include a WFDS ASP capability attribute. The WFDS ASP capability attribute may be the same as or similar to WFDS ASP capability attribute 100 of FIG. 1, and may include a bit comprising a value indicating whether seeker 360 supports WFDS connection setup and a bit comprising a value indicating whether seeker 360 supports WFDS session setup and teardown. The embodiments are not limited in this context.

At 310, following receipt of the P2P Probe Request, WFDS ASP module 356 may perform a hash matching process to identify one or more service names and/or advertisement IDs matching the service hashes in the P2P Probe Request. At 312, WFDS ASP module 356 may send a P2P Probe Response to WFDS ASP module 366, and the P2P Probe Response may comprise the one or more service names and/or advertisement IDs identified during the hash matching process. The P2P Probe Response may also include a WFDS ASP capability attribute. The WFDS ASP capability attribute may be the same as or similar to WFDS ASP capability attribute 100 of FIG. 1, and may include a bit comprising a value indicating whether advertiser 350 supports WFDS connection setup and a bit comprising a value indicating whether advertiser 350 supports WFDS session setup and teardown. The embodiments are not limited in this context.

At 314, WFDS ASP module 366 may send a P2P Service Discovery Request to WFDS ASP module 356, and the P2P Service Discovery Request may comprise one or more service names and/or service information requests. At 316, WFDS ASP module 356 may perform name matching and service information matching techniques to identify advertisement IDs and service information for services identified in the P2P Service Discovery Request. At 318, WFDS ASP module 356 may send a P2P Service Discovery Response to WFDS ASP module 366, and the P2P Service Discovery Response may comprise the services names and corresponding advertisement IDs and service information.

At 320, WFDS ASP module 366 may generate a SearchResult based on the P2P Service Discovery Response. At 322, service module 364 may send a message to application module 362 that comprises a list of one or more devices advertising the service sought by seeker 360. Based on the information received from WFDS ASP module 356 in the P2P Service Discovery Response, service module 364 may include advertiser 350 in this list of devices. The embodiments are not limited in this context.

It is worthy of note that in various embodiments, advertiser 350 or seeker 360 may terminate communications flow 300 based on the contents of WFDS ASP capability attributes that they receive. For example, if the WFDS ASP capability attribute in the P2P Probe Request indicates that seeker 360 does not support WFDS ASP connection setup, advertiser 350 may choose not to proceed by not sending the P2P Probe Response. In another example, if the WFDS ASP capability attribute in the P2P Probe Response indicates that advertiser 350 does not support WFDS ASP connection setup, seeker 360 may choose not to proceed by not sending the P2P Service Discovery Request. The embodiments are not limited to these examples.

In some embodiments, if they complete the service discovery procedure of which communications flow 300 comprises an example, the manner in which advertiser 350 and seeker 360 proceed may depend on the WFDS ASP connection setup capabilities of advertiser 350 and seeker 360, such as may be described by the WFDS ASP capability attributes in the P2P Probe Request sent at 308 and the P2P Probe Response sent at 312. In various embodiments, if both advertiser 350 and seeker 360 indicate support for WFDS ASP connection setup, seeker 360 may initiate WFDS ASP connection setup with advertiser 350. In some embodiments, if one of advertiser 350 and seeker 360 indicates a lack of support for WFDS ASP connection setup, the device indicating that lack of support may initiate a P2P connection setup procedure to establish a P2P connection with the other device. In various embodiments, if both devices indicate a lack of support for WFDS ASP connection setup, seeker 360 may initiate a P2P connection setup procedure to establish a P2P connection with advertiser 350. The embodiments are not limited in this context.

In some embodiments, if advertiser 350 and seeker 360 complete service discovery and connection setup, the manner in which they further proceed may depend on their WFDS ASP session setup and teardown capabilities, such as may be described by the WFDS ASP capability attributes in the P2P Probe Request sent at 308 and the P2P Probe Response sent at 312. In various embodiments, if either advertiser 350 or seeker 360 indicates lack of support for WFDS ASP session setup, then advertiser 350 and seeker 360 may bypass a WFDS ASP session setup procedure and may begin exchanging service traffic. Similarly, in some embodiments, if either advertiser 350 or seeker 360 indicates lack of support for WFDS ASP session teardown, then advertiser 350 and seeker 360 may subsequently bypass a WFDS ASP session teardown procedure. In various embodiments, if advertiser 350 and seeker 360 both indicate support for WFDS ASP session setup, they may perform the WFDS ASP session setup procedure to establish a WFDS ASP session. Similarly, in some embodiments, if advertiser 350 and seeker 360 both indicate support for WFDS ASP session teardown, they may subsequently perform the WFDS ASP session teardown procedure to terminate the WFDS ASP session. The embodiments are not limited in this context.

Figure 4:
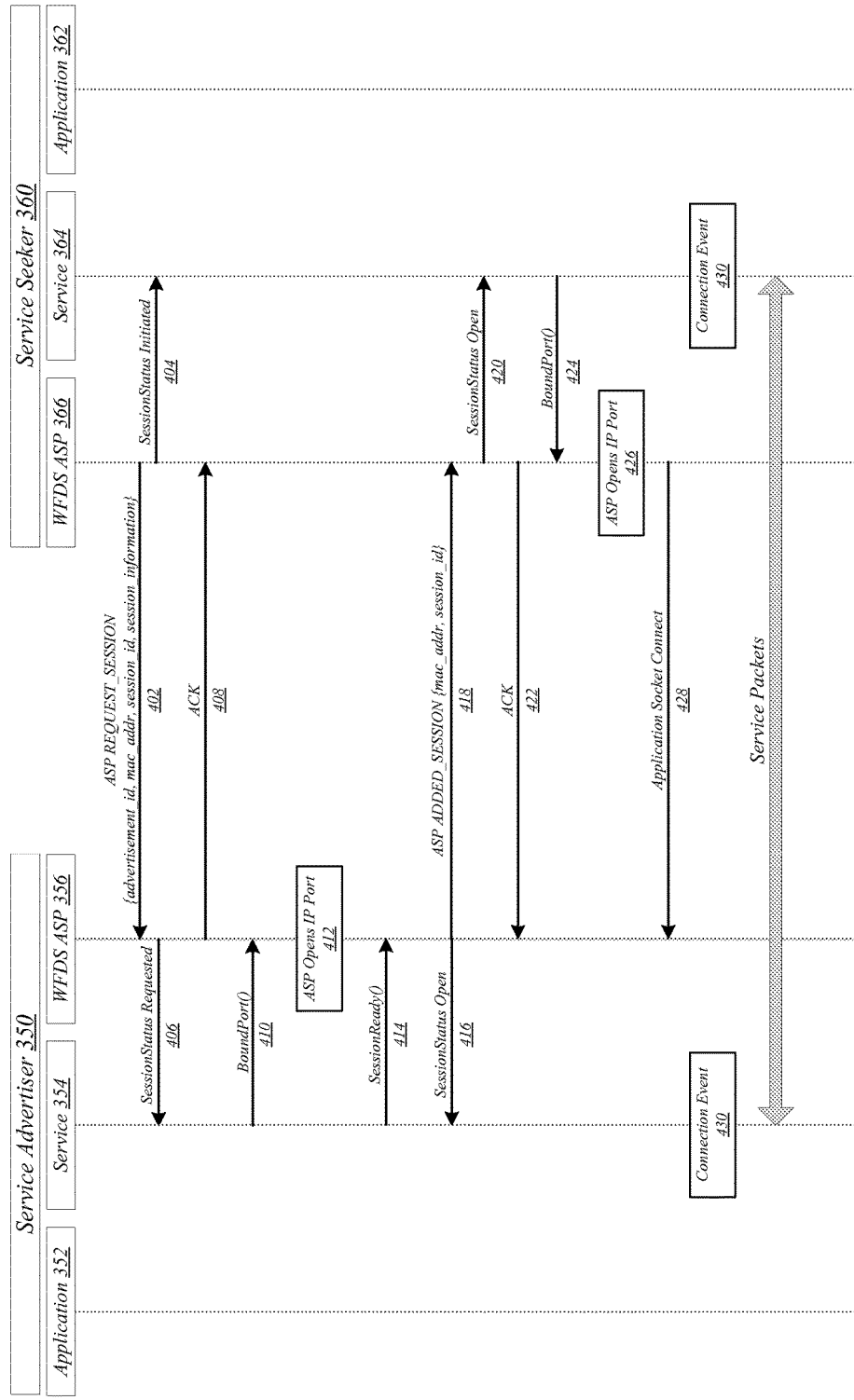
FIG. 4 illustrates an embodiment of a second communications flow.

FIG. 4 illustrates a communications flow 400 that may be representative of a WFDS ASP session setup procedure such as may be performed in various embodiments. More particularly, communications flow 400 may be representative of a WFDS ASP session setup procedure that advertiser 350 and seeker 360 of FIG. 3 may perform when the WFDS ASP capability attributes that they exchange during the WFDS ASP capability negotiation of FIG. 3 indicate that they both support WFDS ASP session setup. Communications flow 400 may begin at 402, where WFDS ASP module 366 may send an ASP REQUEST_SESSION message to WFDS ASP module 356. The ASP REQUEST_SESSION message may include advertisement_id, mac_addr, session_id, and session_information parameters as defined in the WFDS Technical Specification.

At 404, WFDS ASP module 366 may send a SessionStatus message to service module 364 that indicates that it has sent the ASP REQUEST_SESSION message to WFDS ASP module 356 and thus has initiated ASP session establishment. At 406, WFDS ASP module 356 may send a SessionStatus message to service module 354 that indicates that the ASP REQUEST_SESSION message has been received. At 408, WFDS ASP module 356 may send an acknowledgment (ACK) to WFDS ASP module 366, in order to confirm receipt of the ASP REQUEST_SESSION message. At 410, service module 354 may send a BoundPort( ) message to WFDS ASP 356 that indicates that an IP port should be opened. At 412, in response to the BoundPort( ) message, WFDS ASP 356 may open an IP port.

At 414, service module 354 may send a SessionReady( ) message to WFDS ASP module 356 that indicates that the desired ASP session has been created. At 416, WFDS ASP module 356 may send a SessionStatus message to service module 354 that indicates that the ASP session is open and may be used. At 418, WFDS ASP module 356 may send an ASP ADDED_SESSION message to WFDS ASP module 366. The ASP ADDED_SESSION message may include mac_addr and session_id parameters, each of which may comprise information that is the same as or similar to the respective parameter in the ASP REQUEST_SESSION message sent at 402.

At 420, WFDS ASP module 366 may send a SessionStatus message to service module 364 that indicates that the ASP session is open and may be used. At 422, WFDS ASP module 366 may send an ACK to WFDS ASP module 356, in order to confirm receipt of the ASP ADDED_SESSION message. At 424, service module 364 may send a BoundPort( ) message to WFDS ASP 366 that indicates that an IP port should be opened. At 426, in response to the BoundPort( ) message, WFDS ASP 366 may open the IP port. At 428, WFDS ASP module 366 may send an application socket connect message to WFDS ASP module 356 in order enable data exchange between application module 352 and application module 362. Following a connection event at 430, advertiser 350 and seeker 360 may begin to exchange packets. The embodiments are not limited in this context.

Figure 5:
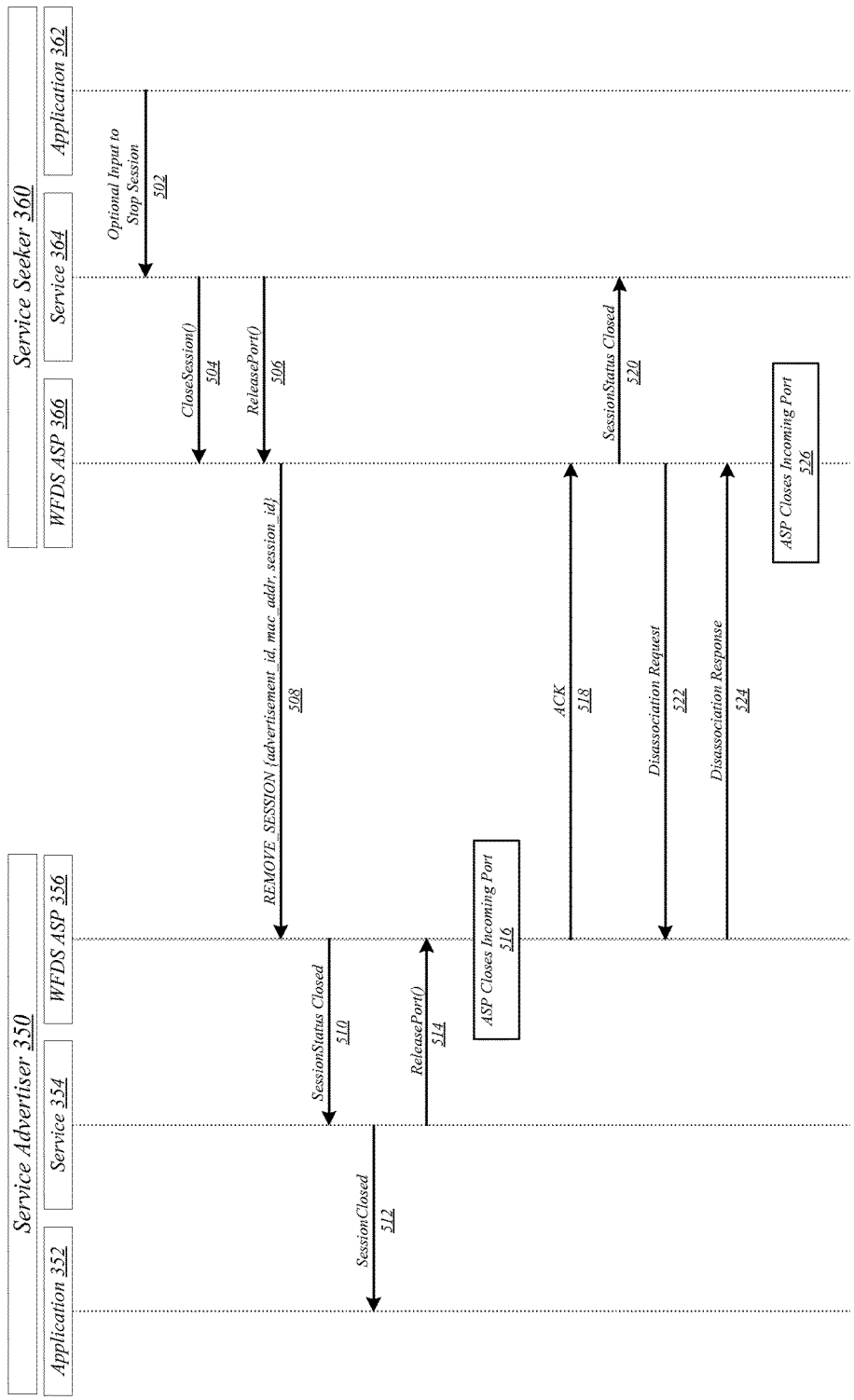
FIG. 5 illustrates an embodiment of a third communications flow.

FIG. 5 illustrates a communications flow 500 that may be representative of a WFDS ASP session teardown procedure such as may be performed in some embodiments. More particularly, communications flow 500 may be representative of a WFDS ASP session teardown procedure that advertiser 350 and seeker 360 of FIGS. 3 and 4 may perform to terminate a WFDS ASP session established via communications flow 400 of FIG. 4. Communications flow 500 may begin at 502, where service module 364 may optionally receive input from application module 362 that indicates that a service session should be stopped. At 504, service module 364 may send a CloseSession( ) instruction to WFDS ASP module 366 that indicates that WFDS ASP module 366 should communicate with WFDS ASP module 356 in order to close the service session. At 506, service module 364 may send a ReleasePort( ) message to WFDS ASP 366 that indicates that an incoming port used by the service session should be closed.

At 508, based on the CloseSession( ) instruction, WFDS ASP module 366 may send a REMOVE_SESSION message to WFDS ASP module 356. The REMOVE_SESSION message may include advertisement_id, mac_addr, and session_id parameters, each of which may comprise information that is the same as or similar to the respective parameter in the ASP REQUEST_SESSION message sent at 402 in FIG. 4. At 510, WFDS ASP module 356 may send a SessionStatus message to service module 354 that indicates that the service session is closed. At 512, service module 354 may in turn send a SessionClosed message to application module 352 to notify application module 352 that the service session is closed.

At 514, service module 354 may send a ReleasePort( ) message to WFDS ASP 356 that indicates that an incoming port used by the service session should be closed. At 516, WFDS ASP 356 may close the incoming port. At 518, WFDS ASP module 356 may send an ACK to WFDS ASP module 366 to confirm receipt of the REMOVE_SESSION message at 506. At 520, WFDS ASP module 366 may send a SessionStatus message to service module 364 that indicates that the service session is closed. At 522, if there are no other sessions still active between advertiser 350 and seeker 360, WFDS ASP module 366 may send a disassociation request WFDS ASP module 356. At 524, WFDS ASP module 356 may respond to the disassociation request by sending a disassociation response to WFDS ASP module 366. At 526, WFDS ASP 366 may close the incoming port identified by the ReleasePort( ) message received from service module 364 at 506. The embodiments are not limited in this context.

FIG. 6 illustrates an embodiment of a storage medium 600. The storage medium 600 may comprise an article of manufacture. In one embodiment, the storage medium 600 may comprise any non-transitory computer-readable medium or machine-readable medium, such as an optical, magnetic or semiconductor storage. The storage medium may store various types of computer-executable instructions 602, such as instructions that, when executed, cause a device to perform communications according to communications flow 300 of FIG. 3, communications flow 400 of FIG. 4, and/or communications flow 500 of FIG. 5. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
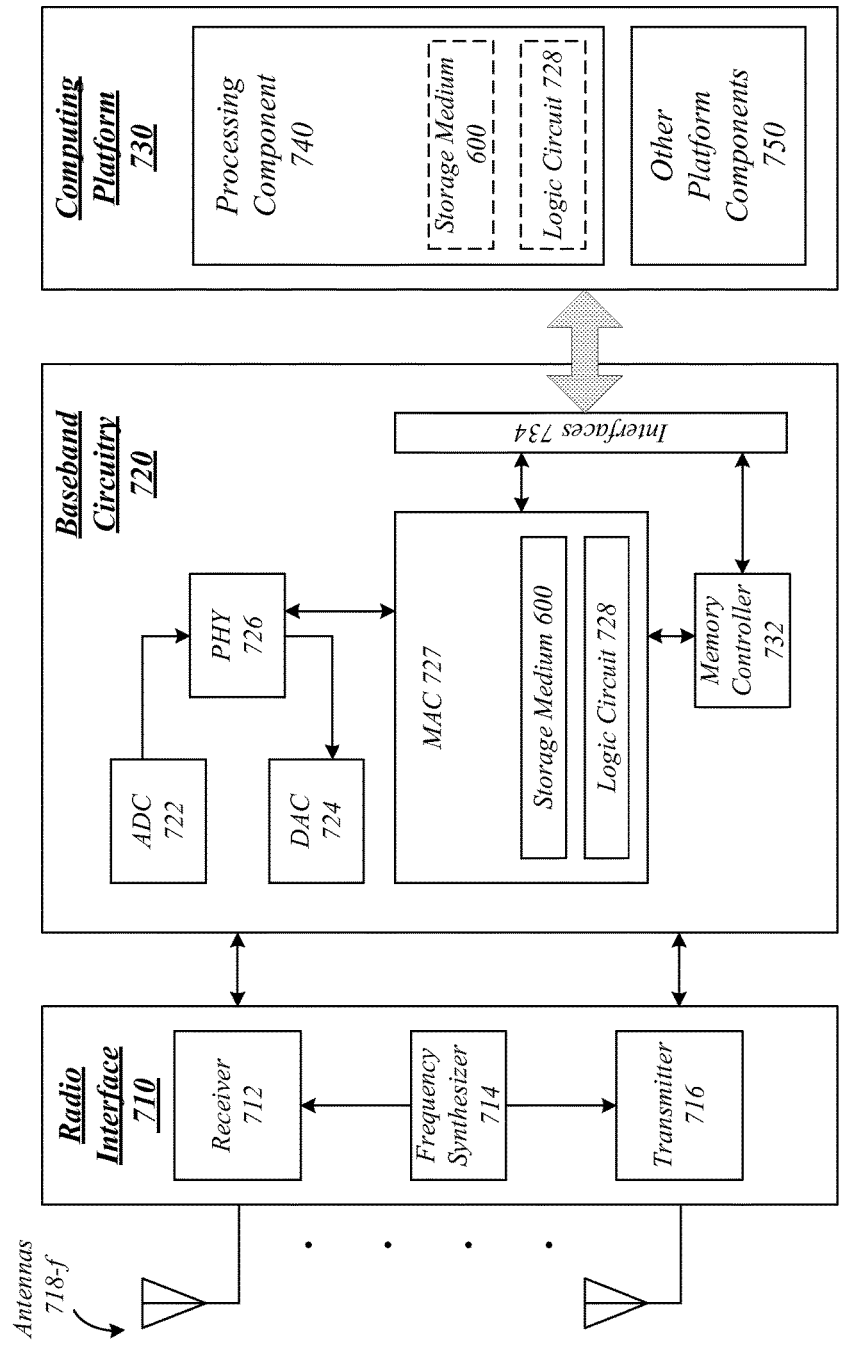
FIG. 7 illustrates an embodiment of a device.

FIG. 7 illustrates an embodiment of a communications device 700 that may implement one or more of wireless communication device 102, wireless communication device 106, service advertiser 350, service seeker 360, and storage medium 600. In various embodiments, device 700 may comprise a logic circuit 728. The logic circuit 728 may include physical circuits to perform operations described for one or more of wireless communication device 102, wireless communication device 106, service advertiser 350, and service seeker 360, for example. As shown in FIG. 7, device 700 may include a radio interface 710, baseband circuitry 720, and computing platform 730, although the embodiments are not limited to this configuration.

The device 700 may implement some or all of the structure and/or operations for one or more of wireless communication device 102, wireless communication device 106, service advertiser 350, service seeker 360, storage medium 600, and logic circuit 728 in a single computing entity, such as entirely within a single device. Alternatively, the device 700 may distribute portions of the structure and/or operations for one or more of wireless communication device 102, wireless communication device 106, service advertiser 350, service seeker 360, storage medium 600, and logic circuit 728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 710 may include, for example, a receiver 712, a frequency synthesizer 714, and/or a transmitter 716. Radio interface 710 may include bias controls, a crystal oscillator and/or one or more antennas 718-*f*. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a medium access control (MAC) processing circuit 727 for MAC/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames. Alternatively or in addition, MAC processing circuit 727 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for one or more of wireless communication device 102, wireless communication device 106, service advertiser 350, service seeker 360, storage medium 600, and logic circuit 728 using the processing component 740. The processing component 740 (and/or PHY 726 and/or MAC 727) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired.

Embodiments of device 700 may be implemented using single input single output (SISO) architectures. However, certain implementations may include multiple antennas (e.g., antennas 718-*f*) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
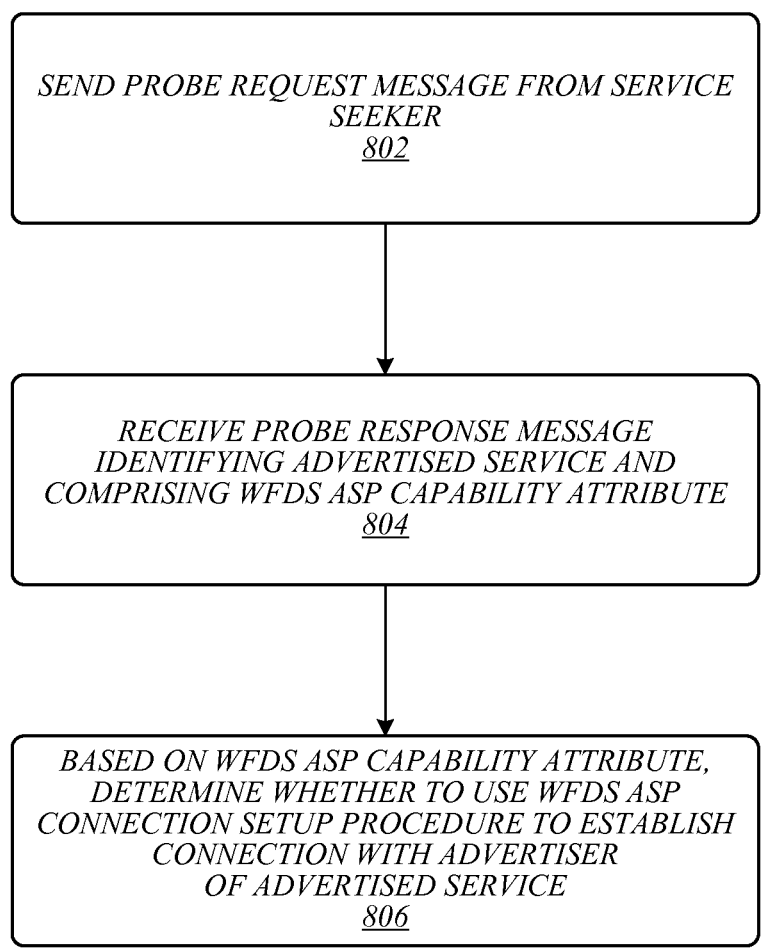
FIG. 8 illustrates an embodiment of a first logic flow.

FIG. 8 illustrates one embodiment of a logic flow 800, which may be representative of operations that may be performed in various embodiments. More particularly, logic flow 800 may be representative of operations that may be performed in some embodiments by a device acting as WFDS service seeker 360 of FIGS. 3-5. For example, in various embodiments, device 700 of FIG. 7 may act as WFDS service seeker 360 of FIGS. 3-5 and may perform the operations of logic flow 800. In some embodiments, a storage medium may comprise a set of instructions that, in response to being executed on a computing device, cause the computing device to perform the operations of logic flow 800. For example, in some embodiments, storage medium 600 of FIG. 6 may comprise computer-executable instructions 602 for performing the operations of logic flow 800, and device 700 of FIG. 7 may be operative to perform the operations of logic flow 800 in conjunction with executing those instructions. The embodiments are not limited in this context.

As shown in logic flow 800, a probe request message may be sent from a service seeker at 802. For example, service seeker 360 may be operative to send a P2P Probe Request to service advertiser 350. At 804, a probe response message may be received that identifies an advertised service and comprises a WFDS ASP capability attribute. For example, service seeker 360 may be operative to receive a P2P Probe Response from service advertiser 350 that identifies an advertised service and comprises a WFDS ASP capability attribute. At 806, a determination may be made, based on the WFDS ASP capability attribute, of whether to use a WFDS ASP connection procedure to establish a connection with an advertiser of the advertised service. For example, service seeker 360 may be operative to determine, based on the WFDS ADP capability attribute comprised in the P2P Probe Response, whether to use a WFDS ASP connection procedure to establish a connection with service advertiser 350. The embodiments are not limited to these examples.

Figure 9:
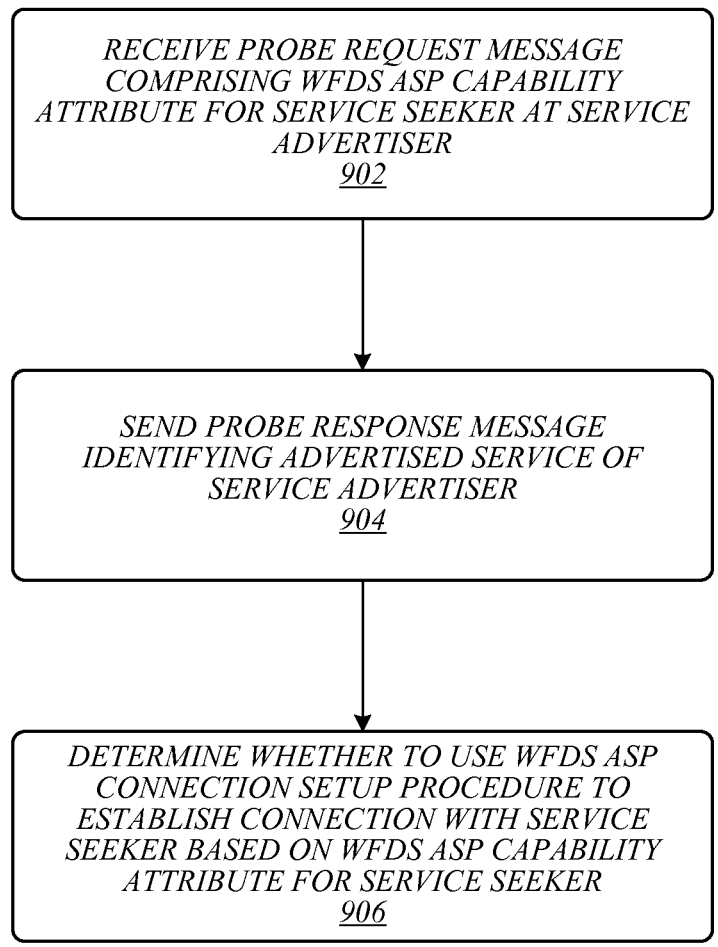
FIG. 9 illustrates an embodiment of a second logic flow.

FIG. 9 illustrates one embodiment of a logic flow 900, which may be representative of operations that may be performed in some embodiments. More particularly, logic flow 900 may be representative of operations that may be performed in various embodiments by a device acting as WFDS service advertiser 350 of FIGS. 3-5. For example, in some embodiments, device 700 of FIG. 7 may act as WFDS service advertiser 350 of FIGS. 3-5 and may perform the operations of logic flow 900. In various embodiments, a storage medium may comprise a set of instructions that, in response to being executed on a computing device, cause the computing device to perform the operations of logic flow 900. For example, in some embodiments, storage medium 600 of FIG. 6 may comprise computer-executable instructions 602 for performing the operations of logic flow 900, and device 700 of FIG. 7 may be operative to perform the operations of logic flow 900 in conjunction with executing those instructions. The embodiments are not limited in this context.

As shown in logic flow 900, a prove request message may be received at a service advertiser at 902 that comprises a WFDS ASP capability attribute for a service seeker. For example, service advertiser 350 may be operative to receive a P2P Probe Request from service seeker 360 that comprises a WFDS ASP capability attribute for service seeker 360. At 904, a probe response message may be sent that identifies an advertised service of the service advertiser. For example, service advertiser 350 may be operative to send a P2P Probe Response that identifies an advertised service of service advertiser 350. At 906, a determination may be made, based on the WFDS ASP capability attribute for the service seeker, of whether to use a WFDS ASP connection setup procedure to establish a connection with the service seeker. For example, service advertiser 350 may be operative to determine, based on the WFDS ADP capability attribute comprised in the P2P Probe Request, whether to use a WFDS ASP connection procedure to establish a connection with service seeker 360. The embodiments are not limited to these examples.

Figure 10:
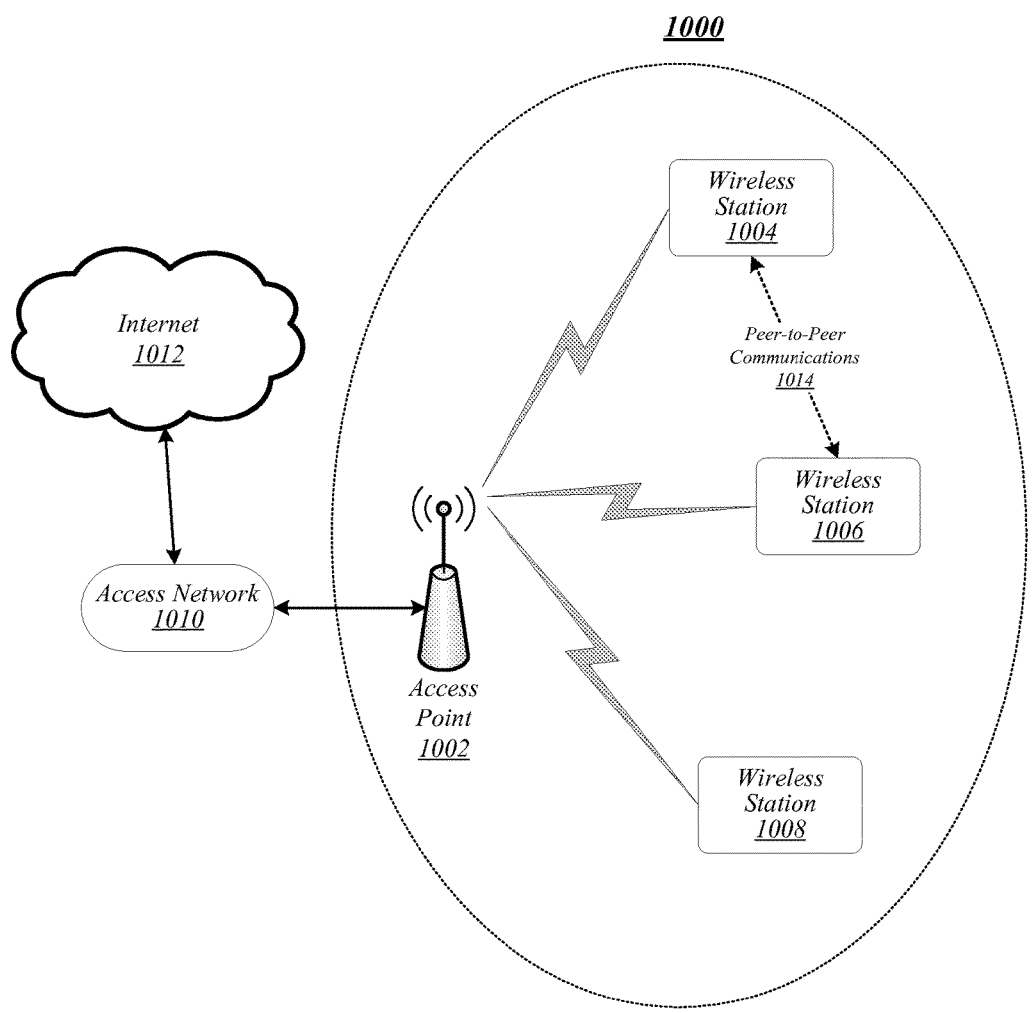
FIG. 10 illustrates an embodiment of wireless network.

FIG. 10 illustrates an embodiment of a wireless network 1000. As shown in FIG. 10, wireless network comprises an access point 1002 and wireless stations 1004, 1006, and 1008. In various embodiments, wireless network 1000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1000 may comprise another type of wireless network, and/or may implement other wireless communications standards. In various embodiments, for example, wireless network 1000 may comprise a WWAN or WPAN rather than a WLAN. The embodiments are not limited to this example.

In some embodiments, wireless network 1000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1× RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1004, 1006, and 1008 may communicate with access point 1002 in order to obtain connectivity to one or more external data networks. In some embodiments, for example, wireless stations 1004, 1006, and 1008 may connect to the Internet 1012 via access point 1002 and access network 1010. In various embodiments, access network 1010 may comprise a private network that provides subscription-based Internet-connectivity, such as an Internet Service Provider (ISP) network. The embodiments are not limited to this example.

In various embodiments, two or more of wireless stations 1004, 1006, and 1008 may communicate with each other directly by exchanging peer-to-peer communications. For example, in the example of FIG. 10, wireless stations 1004 and 1006 communicate with each other directly by exchanging peer-to-peer communications 1014. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising logic, at least a portion of which is in hardware, the logic to send a probe request message from a service seeker and receive a probe response message in response to the probe request message, the probe response message to identify an advertised service and comprise a Wi-Fi Direct Services (WFDS) application service platform (ASP) capability attribute, the logic to determine whether to use a WFDS ASP connection setup procedure to establish a connection with an advertiser of the advertised service, based on the WFDS ASP capability attribute.

In Example 2, the logic of Example 1 may optionally establish a connection with the advertiser using the WFDS ASP connection setup procedure in response to a determination that the WFDS ASP capability attribute indicates that the advertiser is capable of performing the WFDS ASP connection setup procedure.

In Example 3, the WFDS ASP capability attribute of any of Examples 1 to 2 may optionally comprise a value to indicate whether the advertiser is capable of performing a WFDS ASP session setup procedure.

In Example 4, the logic of Example 3 may optionally establish a session with the advertiser using the WFDS ASP session setup procedure in response to a determination that the WFDS ASP capability attribute indicates that the advertiser is capable of performing the WFDS ASP session setup procedure.

In Example 5, the logic of Example 4 may optionally initiate the WFDS ASP session setup procedure by sending an ASP REQUEST_SESSION message.

In Example 6, the ASP REQUEST_SESSION message of Example 5 may optionally comprise an advertisement identifier (ID) for the advertised service.

In Example 7, the logic of Example 3 may optionally bypass the WFDS ASP session setup procedure in response to a determination that the WFDS ASP capability attribute indicates that the advertiser is not capable of performing the WFDS ASP session setup procedure.

In Example 8, the WFDS ASP capability attribute of any of Examples 1 to 7 may optionally comprise a value indicating whether the advertiser is capable of performing a WFDS ASP session teardown procedure.

In Example 9, the logic of Example 8 may optionally terminate a session with the advertiser using the WFDS ASP session teardown procedure in response to a determination that the WFDS ASP capability attribute indicates that the advertiser is capable of performing the WFDS ASP session teardown procedure.

In Example 10, the logic of Example 9 may optionally initiate the WFDS ASP session teardown procedure by sending a REMOVE_SESSION message.

In Example 11, the REMOVE_SESSION message of Example 10 may optionally comprise an advertisement identifier (ID) for the advertised service.

In Example 12, the probe request message of any of Examples 1 to 11 may optionally comprise a second WFDS ASP capability attribute to comprise a value to indicate whether the service seeker is capable of performing a WFDS ASP session setup procedure.

In Example 13, the second WFDS ASP capability attribute of Example 12 may optionally comprise a value to indicate whether the service seeker is capable of performing a WFDS ASP session teardown procedure.

In Example 14, the probe request message of any of Examples 1 to 13 may optionally comprise a peer-to-peer (P2P) probe request, and the probe response message may optionally comprise a peer-to-peer (P2P) probe response.

In Example 15, the probe request message of any of Examples 1 to 14 may optionally comprise one or more service hashes.

In Example 16, the probe response message of Example 15 may optionally comprise a service name for the advertised service, the service name to match at least one of the one or more service hashes.

In Example 17, the logic of any of Examples 1 to 16 may optionally send a peer-to-peer (P2P) service discovery request comprising a service name for the advertised service and receive a P2P service discovery response in response to the P2P service discovery request.

In Example 18, the P2P service discovery request of Example 17 may optionally comprise a service information request.

In Example 19, the P2P service discovery response of any of Examples 17 to 18 may optionally comprise service information for the advertised service.

In Example 20, the P2P service discovery response of any of Examples 17 to 19 may optionally comprise an advertisement identifier (ID) for the advertised service.

Example 21 is a system, comprising a wireless communication apparatus according to any of Examples 1 to 20, a radio frequency (RF) transceiver, and one or more RF antennas.

In Example 22, the system of Example 21 may optionally comprise a display.

Example 23 is a wireless communication apparatus, comprising logic, at least a portion of which is in hardware, the logic to receive a probe request message at a service advertiser and send a probe response message in response to the probe request message, the probe request message to comprise a Wi-Fi Direct Services (WFDS) application service platform (ASP) capability attribute for a service seeker, the probe response message to identify an advertised service of the service advertiser, the logic to determine whether to use a WFDS ASP connection setup procedure to establish a connection with the service seeker based on the WFDS ASP capability attribute for the service seeker.

In Example 24, the logic of Example 23 may optionally establish a connection with the service seeker using the WFDS ASP connection setup procedure in response to a determination that the service advertiser is capable of performing the WFDS ASP connection setup procedure and the WFDS ASP capability attribute for the service seeker indicates that the service seeker is capable of performing the WFDS ASP connection setup procedure.

In Example 25, the logic of Example 23 may optionally establish a connection with the service seeker using a peer-to-peer (P2P) connection setup procedure in response to a determination that the service advertiser is not capable of performing the WFDS ASP connection setup procedure and the WFDS ASP capability attribute for the service seeker indicates that the service seeker is capable of performing the WFDS ASP connection setup procedure.

In Example 26, the probe response message of any of Examples 23 to 25 may optionally comprise a WFDS ASP capability attribute for the service advertiser.

In Example 27, the WFDS ASP capability attribute for the service advertiser of Example 26 may optionally comprise a value to indicate whether the service advertiser is capable of performing the WFDS ASP connection setup procedure.

In Example 28, the WFDS ASP capability attribute for the service advertiser of any of Examples 26 to 27 may optionally comprise a value to indicate whether the service advertiser is capable of performing a WFDS ASP session setup procedure.

In Example 29, the WFDS ASP capability attribute for the service seeker of Example 28 may optionally comprise a value to indicate whether the service seeker is capable of performing the WFDS ASP session setup procedure.

In Example 30, the WFDS ASP capability attribute for the service advertiser of any of Examples 26 to 29 may optionally comprise a value to indicate whether the service advertiser is capable of performing a WFDS ASP session teardown procedure.

In Example 31, the WFDS ASP capability attribute for the service seeker of Example 30 may optionally comprise a value to indicate whether the service seeker is capable of performing the WFDS ASP session teardown procedure.

In Example 32, the probe request message of any of Examples 23 to 31 may optionally comprise a peer-to-peer (P2P) probe request, and the probe response message may optionally comprise a peer-to-peer (P2P) probe response.

In Example 33, the probe request message of any of Examples 23 to 32 may optionally comprise one or more service hashes.

In Example 34, the logic of Example 33 may optionally perform a hash matching process to identify one or more services names that match at least one of the one or more services hashes.

In Example 35, the one or more services names of Example 34 may optionally comprise a service name for the advertised service.

Example 36 is a system, comprising a wireless communication apparatus according to any of Examples 23 to 35, a radio frequency (RF) transceiver, and one or more RF antennas.

In Example 37, the system of Example 36 may optionally comprise a display.

Example 38 is at least one non-transitory computer-readable medium, comprising a set of wireless communication instructions that, in response to being executed on a computing device, cause the computing device to send a probe request message from a service seeker, receive a probe response message in response to the probe request message, the probe response message to identify an advertised service and comprise a Wi-Fi Direct Services (WFDS) application service platform (ASP) capability attribute, and determine whether to use a WFDS ASP connection setup procedure to establish a connection with an advertiser of the advertised service, based on the WFDS ASP capability attribute.

In Example 39, the at least one non-transitory computer-readable medium of Example 38 may optionally comprise wireless communication instructions that, in response to being executed on the computing device, cause the computing device to establish a connection with the advertiser using the WFDS ASP connection setup procedure in response to a determination that the WFDS ASP capability attribute indicates that the advertiser is capable of performing the WFDS ASP connection setup procedure.

In Example 40, the WFDS ASP capability attribute of any of Examples 38 to 39 may optionally comprise a value to indicate whether the advertiser is capable of performing a WFDS ASP session setup procedure.

In Example 41, the at least one non-transitory computer-readable medium of Example 40 may optionally comprise wireless communication instructions that, in response to being executed on the computing device, cause the computing device to establish a session with the advertiser using the WFDS ASP session setup procedure in response to a determination that the WFDS ASP capability attribute indicates that the advertiser is capable of performing the WFDS ASP session setup procedure.

In Example 42, the at least one non-transitory computer-readable medium of Example 41 may optionally comprise wireless communication instructions that, in response to being executed on the computing device, cause the computing device to initiate the WFDS ASP session setup procedure by sending an ASP REQUEST_SESSION message.

In Example 43, the ASP REQUEST_SESSION message of Example 42 may optionally comprise an advertisement identifier (ID) for the advertised service.

In Example 44, the at least one non-transitory computer-readable medium of Example 40 may optionally comprise wireless communication instructions that, in response to being executed on the computing device, cause the computing device to bypass the WFDS ASP session setup procedure in response to a determination that the WFDS ASP capability attribute indicates that the advertiser is not capable of performing the WFDS ASP session setup procedure.

In Example 45, the WFDS ASP capability attribute of any of Examples 38 to 44 may optionally comprise a value indicating whether the advertiser is capable of performing a WFDS ASP session teardown procedure.

In Example 46, the at least one non-transitory computer-readable medium of Example 45 may optionally comprise wireless communication instructions that, in response to being executed on the computing device, cause the computing device to terminate a session with the advertiser using the WFDS ASP session teardown procedure in response to a determination that the WFDS ASP capability attribute indicates that the advertiser is capable of performing the WFDS ASP session teardown procedure.

In Example 47, the at least one non-transitory computer-readable medium of Example 46 may optionally comprise wireless communication instructions that, in response to being executed on the computing device, cause the computing device to initiate the WFDS ASP session teardown procedure by sending a REMOVE_SESSION message.

In Example 48, the REMOVE_SESSION message of Example 47 may optionally comprise an advertisement identifier (ID) for the advertised service.

In Example 49, the probe request message of any of Examples 38 to 48 may optionally comprise a second WFDS ASP capability attribute to comprise a value to indicate whether the service seeker is capable of performing a WFDS ASP session setup procedure.

In Example 50, the second WFDS ASP capability attribute of Example 49 may optionally comprise a value to indicate whether the service seeker is capable of performing a WFDS ASP session teardown procedure.

In Example 51, the probe request message of any of Examples 38 to 50 may optionally comprise a peer-to-peer (P2P) probe request, and the probe response message may optionally comprise a peer-to-peer (P2P) probe response.

In Example 52, the probe request message of any of Examples 38 to 51 may optionally comprise one or more service hashes.

In Example 53, the probe response message of Example 52 may optionally comprise a service name for the advertised service, the service name to match at least one of the one or more service hashes.

In Example 54, the at least one non-transitory computer-readable medium of any of Examples 38 to 53 may optionally comprise wireless communication instructions that, in response to being executed on the computing device, cause the computing device to send a peer-to-peer (P2P) service discovery request comprising a service name for the advertised service, and receive a P2P service discovery response in response to the P2P service discovery request.

In Example 55, the P2P service discovery request of Example 54 may optionally comprise a service information request.

In Example 56, the P2P service discovery response of any of Examples 54 to 55 may optionally comprise service information for the advertised service.

In Example 57, the P2P service discovery response of any of Examples 54 to 56 may optionally comprise an advertisement identifier (ID) for the advertised service.

Example 58 is at least one non-transitory computer-readable medium, comprising a set of wireless communication instructions that, in response to being executed on a computing device, cause the computing device to receive a probe request message at a service advertiser, the probe request message to comprise a Wi-Fi Direct Services (WFDS) application service platform (ASP) capability attribute for a service seeker, send a probe response message in response to the probe request message, the probe response message to identify an advertised service of the service advertiser, and determine whether to use a WFDS ASP connection setup procedure to establish a connection with the service seeker based on the WFDS ASP capability attribute for the service seeker.

In Example 59, the at least one non-transitory computer-readable medium of Example 58 may optionally comprise wireless communication instructions that, in response to being executed on the computing device, cause the computing device to establish a connection with the service seeker using the WFDS ASP connection setup procedure in response to a determination that the service advertiser is capable of performing the WFDS ASP connection setup procedure and the WFDS ASP capability attribute for the service seeker indicates that the service seeker is capable of performing the WFDS ASP connection setup procedure.

In Example 60, the at least one non-transitory computer-readable medium of Example 58 may optionally comprise wireless communication instructions that, in response to being executed on the computing device, cause the computing device to establish a connection with the service seeker using a peer-to-peer (P2P) connection setup procedure in response to a determination that the service advertiser is not capable of performing the WFDS ASP connection setup procedure and the WFDS ASP capability attribute for the service seeker indicates that the service seeker is capable of performing the WFDS ASP connection setup procedure.

In Example 61, the probe response message of any of Examples 58 to 60 may optionally comprise a WFDS ASP capability attribute for the service advertiser.

In Example 62, the WFDS ASP capability attribute for the service advertiser of Example 61 may optionally comprise a value to indicate whether the service advertiser is capable of performing the WFDS ASP connection setup procedure.

In Example 63, the WFDS ASP capability attribute for the service advertiser of any of Examples 61 to 62 may optionally comprise a value to indicate whether the service advertiser is capable of performing a WFDS ASP session setup procedure.

In Example 64, the WFDS ASP capability attribute for the service seeker of Example 63 may optionally comprise a value to indicate whether the service seeker is capable of performing the WFDS ASP session setup procedure.

In Example 65, the WFDS ASP capability attribute for the service advertiser of any of Examples 61 to 64 may optionally comprise a value to indicate whether the service advertiser is capable of performing a WFDS ASP session teardown procedure.

In Example 66, the WFDS ASP capability attribute for the service seeker of Example 65 may optionally comprise a value to indicate whether the service seeker is capable of performing the WFDS ASP session teardown procedure.

In Example 67, the probe request message of any of Examples 58 to 66 may optionally comprise a peer-to-peer (P2P) probe request, and the probe response message may optionally comprise a peer-to-peer (P2P) probe response.

In Example 68, the probe request message of any of Examples 58 to 67 may optionally comprise one or more service hashes.

In Example 69, the at least one non-transitory computer-readable medium of Example 68 may optionally comprise wireless communication instructions that, in response to being executed on the computing device, cause the computing device to perform a hash matching process to identify one or more services names that match at least one of the one or more services hashes.

In Example 70, the one or more services names of Example 70 may optionally comprise a service name for the advertised service.

Example 71 is a wireless communication method, comprising sending a probe request message from a service seeker, receiving a probe response message in response to the probe request message, the probe response message to identify an advertised service and comprise a Wi-Fi Direct Services (WFDS) application service platform (ASP) capability attribute, and determining, by a processor circuit, whether to use a WFDS ASP connection setup procedure to establish a connection with an advertiser of the advertised service, based on the WFDS ASP capability attribute.

In Example 72, the wireless communication method of Example 71 may optionally comprise establishing a connection with the advertiser using the WFDS ASP connection setup procedure in response to a determination that the WFDS ASP capability attribute indicates that the advertiser is capable of performing the WFDS ASP connection setup procedure.

In Example 73, the WFDS ASP capability attribute of any of Examples 71 to 72 may optionally comprise a value to indicate whether the advertiser is capable of performing a WFDS ASP session setup procedure.

In Example 74, the wireless communication method of Example 73 may optionally comprise establishing a session with the advertiser using the WFDS ASP session setup procedure in response to a determination that the WFDS ASP capability attribute indicates that the advertiser is capable of performing the WFDS ASP session setup procedure.

In Example 75, the wireless communication method of Example 74 may optionally comprise initiating the WFDS ASP session setup procedure by sending an ASP REQUEST_SESSION message.

In Example 76, the ASP REQUEST_SESSION message of Example 75 may optionally comprise an advertisement identifier (ID) for the advertised service.

In Example 77, the wireless communication method of Example 73 may optionally comprise bypassing the WFDS ASP session setup procedure in response to a determination that the WFDS ASP capability attribute indicates that the advertiser is not capable of performing the WFDS ASP session setup procedure.

In Example 78, the WFDS ASP capability attribute of any of Examples 71 to 77 may optionally comprise a value indicating whether the advertiser is capable of performing a WFDS ASP session teardown procedure.

In Example 79, the wireless communication method of Example 78 may optionally comprise terminating a session with the advertiser using the WFDS ASP session teardown procedure in response to a determination that the WFDS ASP capability attribute indicates that the advertiser is capable of performing the WFDS ASP session teardown procedure.

In Example 80, the wireless communication method of Example 79 may optionally comprise initiating the WFDS ASP session teardown procedure by sending a REMOVE_SESSION message.

In Example 81, the REMOVE_SESSION message of Example 80 may optionally comprise an advertisement identifier (ID) for the advertised service.

In Example 82, the probe request message of any of Examples 71 to 81 may optionally comprise a second WFDS ASP capability attribute to comprise a value to indicate whether the service seeker is capable of performing a WFDS ASP session setup procedure.

In Example 83, the second WFDS ASP capability attribute of Example 82 may optionally comprise a value to indicate whether the service seeker is capable of performing a WFDS ASP session teardown procedure.

In Example 84, the probe request message of any of Examples 71 to 83 may optionally comprise a peer-to-peer (P2P) probe request, and the probe response message may optionally comprise a peer-to-peer (P2P) probe response.

In Example 85, the probe request message of any of Examples 71 to 84 may optionally comprise one or more service hashes.

In Example 86, the probe response message of Example 85 may optionally comprise a service name for the advertised service, the service name to match at least one of the one or more service hashes.

In Example 87, the wireless communication method of any of Examples 71 to 86 may optionally comprise sending a peer-to-peer (P2P) service discovery request comprising a service name for the advertised service, and receiving a P2P service discovery response in response to the P2P service discovery request.

In Example 88, the P2P service discovery request of Example 87 may optionally comprise a service information request.

In Example 89, the P2P service discovery response of any of Examples 87 to 88 may optionally comprise service information for the advertised service.

In Example 90, the P2P service discovery response of any of Examples 87 to 89 may optionally comprise an advertisement identifier (ID) for the advertised service.

Example 91 is at least one non-transitory computer-readable medium, comprising a set of instructions that, in response to being executed on a computing device, cause the computing device to perform a wireless communication method according to any of Examples 71 to 90.

Example 92 is an apparatus, comprising means for performing a wireless communication method according to any of Examples 71 to 90.

Example 93 is a system, comprising an apparatus according to Example 92, a radio frequency (RF) transceiver, and one or more RF antennas.

In Example 94, the system of Example 93 may optionally comprise a display.

Example 95 is a wireless communication method, comprising receiving a probe request message at a service advertiser, the probe request message to comprise a Wi-Fi Direct Services (WFDS) application service platform (ASP) capability attribute for a service seeker, sending a probe response message in response to the probe request message, the probe response message to identify an advertised service of the service advertiser, and determining, by a processor circuit, whether to use a WFDS ASP connection setup procedure to establish a connection with the service seeker based on the WFDS ASP capability attribute for the service seeker.

In Example 96, the wireless communication method of Example 95 may optionally comprise establishing a connection with the service seeker using the WFDS ASP connection setup procedure in response to a determination that the service advertiser is capable of performing the WFDS ASP connection setup procedure and the WFDS ASP capability attribute for the service seeker indicates that the service seeker is capable of performing the WFDS ASP connection setup procedure.

In Example 97, the wireless communication method of Example 95 may optionally comprise establishing a connection with the service seeker using a peer-to-peer (P2P) connection setup procedure in response to a determination that the service advertiser is not capable of performing the WFDS ASP connection setup procedure and the WFDS ASP capability attribute for the service seeker indicates that the service seeker is capable of performing the WFDS ASP connection setup procedure.

In Example 98, the probe response message of any of Examples 95 to 97 may optionally comprise a WFDS ASP capability attribute for the service advertiser.

In Example 99, the WFDS ASP capability attribute for the service advertiser of Example 98 may optionally comprise a value to indicate whether the service advertiser is capable of performing the WFDS ASP connection setup procedure.

In Example 100, the WFDS ASP capability attribute for the service advertiser of any of Examples 98 to 99 may optionally comprise a value to indicate whether the service advertiser is capable of performing a WFDS ASP session setup procedure.

In Example 101, the WFDS ASP capability attribute for the service seeker of Example 100 may optionally comprise a value to indicate whether the service seeker is capable of performing the WFDS ASP session setup procedure.

In Example 102, the WFDS ASP capability attribute for the service advertiser of any of Examples 98 to 101 may optionally comprise a value to indicate whether the service advertiser is capable of performing a WFDS ASP session teardown procedure.

In Example 103, the WFDS ASP capability attribute for the service seeker of Example 102 may optionally comprise a value to indicate whether the service seeker is capable of performing the WFDS ASP session teardown procedure.

In Example 104, the probe request message of any of Examples 95 to 103 may optionally comprise a peer-to-peer (P2P) probe request, and the probe response message may optionally comprise a peer-to-peer (P2P) probe response.

In Example 105, the probe request message of any of Examples 95 to 104 may optionally comprise one or more service hashes.

In Example 106, the wireless communication method of Example 105 may optionally comprise performing a hash matching process to identify one or more services names that match at least one of the one or more services hashes.

In Example 107, the one or more services names of Example 106 may optionally comprise a service name for the advertised service.

Example 108 is at least one non-transitory computer-readable medium, comprising a set of instructions that, in response to being executed on a computing device, cause the computing device to perform a wireless communication method according to any of Examples 95 to 107.

Example 109 is an apparatus, comprising means for performing a wireless communication method according to any of Examples 95 to 107.

Example 110 is a system, comprising an apparatus according to Example 109, a radio frequency (RF) transceiver, and one or more RF antennas.

In Example 111, the system of Example 110 may optionally comprise a display.

Example 112 is a wireless communication apparatus, comprising means for sending a probe request message from a service seeker, means for receiving a probe response message in response to the probe request message, the probe response message to identify an advertised service and comprise a Wi-Fi Direct Services (WFDS) application service platform (ASP) capability attribute, and means for determining whether to use a WFDS ASP connection setup procedure to establish a connection with an advertiser of the advertised service, based on the WFDS ASP capability attribute.

In Example 113, the wireless communication apparatus of Example 112 may optionally comprise means for establishing a connection with the advertiser using the WFDS ASP connection setup procedure in response to a determination that the WFDS ASP capability attribute indicates that the advertiser is capable of performing the WFDS ASP connection setup procedure.

In Example 114, the WFDS ASP capability attribute of any of Examples 112 to 113 may optionally comprise a value to indicate whether the advertiser is capable of performing a WFDS ASP session setup procedure.

In Example 115, the wireless communication apparatus of Example 114 may optionally comprise means for establishing a session with the advertiser using the WFDS ASP session setup procedure in response to a determination that the WFDS ASP capability attribute indicates that the advertiser is capable of performing the WFDS ASP session setup procedure.

In Example 116, the wireless communication apparatus of Example 115 may optionally comprise means for initiating the WFDS ASP session setup procedure by sending an ASP REQUEST_SESSION message.

In Example 117, the ASP REQUEST_SESSION message of Example 116 may optionally comprise an advertisement identifier (ID) for the advertised service.

In Example 118, the wireless communication apparatus of Example 114 may optionally comprise means for bypassing the WFDS ASP session setup procedure in response to a determination that the WFDS ASP capability attribute indicates that the advertiser is not capable of performing the WFDS ASP session setup procedure.

In Example 119, the WFDS ASP capability attribute of any of Examples 112 to 118 may optionally comprise a value indicating whether the advertiser is capable of performing a WFDS ASP session teardown procedure.

In Example 120, the wireless communication apparatus of Example 119 may optionally comprise means for terminating a session with the advertiser using the WFDS ASP session teardown procedure in response to a determination that the WFDS ASP capability attribute indicates that the advertiser is capable of performing the WFDS ASP session teardown procedure.

In Example 121, the wireless communication apparatus of Example 120 may optionally comprise means for initiating the WFDS ASP session teardown procedure by sending a REMOVE_SESSION message.

In Example 122, the REMOVE_SESSION message of Example 121 may optionally comprise an advertisement identifier (ID) for the advertised service.

In Example 123, the probe request message of any of Examples 112 to 122 may optionally comprise a second WFDS ASP capability attribute to comprise a value to indicate whether the service seeker is capable of performing a WFDS ASP session setup procedure.

In Example 124, the second WFDS ASP capability attribute of Example 123 may optionally comprise a value to indicate whether the service seeker is capable of performing a WFDS ASP session teardown procedure.

In Example 125, the probe request message of any of Examples 112 to 124 may optionally comprise a peer-to-peer (P2P) probe request, and the probe response message may optionally comprise a peer-to-peer (P2P) probe response.

In Example 126, the probe request message of any of Examples 112 to 125 may optionally comprise one or more service hashes.

In Example 127, the probe response message of Example 126 may optionally comprise a service name for the advertised service, the service name to match at least one of the one or more service hashes.

In Example 128, the wireless communication apparatus of any of Examples 112 to 127 may optionally comprise means for sending a peer-to-peer (P2P) service discovery request comprising a service name for the advertised service, and means for receiving a P2P service discovery response in response to the P2P service discovery request.

In Example 129, the P2P service discovery request of Example 128 may optionally comprise a service information request.

In Example 130, the P2P service discovery response of any of Examples 128 to 129 may optionally comprise service information for the advertised service.

In Example 131, the P2P service discovery response of any of Examples 128 to 130 may optionally comprise an advertisement identifier (ID) for the advertised service.

Example 132 is a system, comprising a wireless communication apparatus according to any of Examples 112 to 131, a radio frequency (RF) transceiver, and one or more RF antennas.

In Example 133, the system of Example 132 may optionally comprise a display.

Example 134 is a wireless communication apparatus, comprising means for receiving a probe request message at a service advertiser, the probe request message to comprise a Wi-Fi Direct Services (WFDS) application service platform (ASP) capability attribute for a service seeker, means for sending a probe response message in response to the probe request message, the probe response message to identify an advertised service of the service advertiser, and means for determining whether to use a WFDS ASP connection setup procedure to establish a connection with the service seeker based on the WFDS ASP capability attribute for the service seeker.

In Example 135, the wireless communication apparatus of Example 134 may optionally comprise means for establishing a connection with the service seeker using the WFDS ASP connection setup procedure in response to a determination that the service advertiser is capable of performing the WFDS ASP connection setup procedure and the WFDS ASP capability attribute for the service seeker indicates that the service seeker is capable of performing the WFDS ASP connection setup procedure.

In Example 136, the wireless communication apparatus of Example 134 may optionally comprise means for establishing a connection with the service seeker using a peer-to-peer (P2P) connection setup procedure in response to a determination that the service advertiser is not capable of performing the WFDS ASP connection setup procedure and the WFDS ASP capability attribute for the service seeker indicates that the service seeker is capable of performing the WFDS ASP connection setup procedure.

In Example 137, the probe response message of any of Examples 134 to 136 may optionally comprise a WFDS ASP capability attribute for the service advertiser.

In Example 138, the WFDS ASP capability attribute for the service advertiser of Example 137 may optionally comprise a value to indicate whether the service advertiser is capable of performing the WFDS ASP connection setup procedure.

In Example 139, the WFDS ASP capability attribute for the service advertiser of any of Examples 137 to 138 may optionally comprise a value to indicate whether the service advertiser is capable of performing a WFDS ASP session setup procedure.

In Example 140, the WFDS ASP capability attribute for the service seeker of Example 139 may optionally comprise a value to indicate whether the service seeker is capable of performing the WFDS ASP session setup procedure.

In Example 141, the WFDS ASP capability attribute for the service advertiser of any of Examples 137 to 140 may optionally comprise a value to indicate whether the service advertiser is capable of performing a WFDS ASP session teardown procedure.

In Example 142, the WFDS ASP capability attribute for the service seeker of Example 141 may optionally comprise a value to indicate whether the service seeker is capable of performing the WFDS ASP session teardown procedure.

In Example 143, the probe request message of any of Examples 134 to 142 may optionally comprise a peer-to-peer (P2P) probe request, and the probe response message may optionally comprise a peer-to-peer (P2P) probe response.

In Example 144, the probe request message of any of Examples 134 to 143 may optionally comprise one or more service hashes.

In Example 145, the wireless communication apparatus of Example 144 may optionally comprise means for performing a hash matching process to identify one or more services names that match at least one of the one or more services hashes.

In Example 146, the one or more services names of Example 145 may optionally comprise a service name for the advertised service.

Example 147 is a system, comprising a wireless communication apparatus according to any of Examples 134 to 146, a radio frequency (RF) transceiver, and one or more RF antennas.

In Example 148, the system of Example 147 may optionally comprise a display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processor; and
   logic, at least a portion of which is in hardware, the logic configured to:
   send a probe request message from a service seeker and receive a probe response message in response to the probe request message, the probe response message to identify an advertised service and comprise a Wi-Fi Direct Services (WFDS) application service platform (ASP) capability attribute, the logic to determine whether to use a WFDS ASP connection setup procedure to establish a connection with an advertiser of the advertised service, based on the WFDS ASP capability attribute of the advertiser and a WFDS ASP capability attribute of the service seeker.

2. The apparatus of claim 1, the probe request message comprising a value indicating that the service seeker is capable of performing the WFDS ASP connection setup procedure, the logic further configured to establish a connection with the advertiser using the WFDS ASP connection setup procedure in response to a determination that the WFDS ASP capability attribute of the advertiser and the WFDS ASP capability attribute of the service seeker indicate that the advertiser and the service seeker, respectively, are capable of performing the WFDS ASP connection setup procedure.

3. The apparatus of claim 1, the WFDS ASP capability attribute of the advertiser comprising a value indicating whether the advertiser is capable of performing a WFDS ASP session setup procedure, the WFDS ASP capability attribute of the service seeker comprising a value indicating whether the service seeker is capable of performing the WFDS ASP session setup procedure.

4. The apparatus of claim 3, the logic further configured to establish a session with the advertiser using the WFDS ASP session setup procedure in response to a determination that the WFDS ASP capability attribute of the advertiser and the WFDS ASP capability attribute of the service seeker indicate that the advertiser and the service seeker, respectively, are capable of performing the WFDS ASP session setup procedure.

5. The apparatus of claim 3, the logic further configured to bypass the WFDS ASP session setup procedure in response to a determination that the WFDS ASP capability attribute of the advertiser indicates that the advertiser is not capable of performing the WFDS ASP session setup procedure.

6. The apparatus of claim 1, the WFDS ASP capability attribute of the advertiser further comprising a value indicating whether the advertiser is capable of performing a WFDS ASP session teardown procedure, the WFDS ASP capability attribute of the service seeker further comprising a value to indicate whether the service seeker is capable of performing the WFDS ASP session teardown procedure.

7. The apparatus of claim 6, the logic further configured to terminate a session with the advertiser using the WFDS ASP session teardown procedure in response to a determination that the WFDS ASP capability attribute of the advertiser indicates that the advertiser is capable of performing the WFDS ASP session teardown procedure.

8. The apparatus of claim 1, the probe request message specifying a second WFDS ASP capability attribute comprising a value indicating whether the service seeker is capable of performing a WFDS ASP session setup procedure, the logic further configured to:
   bypass the WFDS ASP connection setup procedure in response to a determination that the WFDS ASP capability attribute of a first one of the service seeker and the advertiser indicates that the first one of the service seeker and the advertiser is not capable of performing the WFDS ASP connection setup procedure; and
   establish a Wi-Fi Direct peer-to-peer (P2P) link-layer connection between the service seeker and the advertiser.

9. The apparatus of claim 1, comprising:
   a display;
   a radio frequency (RF) transceiver; and
   one or more RF antennas.

10. At least one non-transitory computer-readable medium, comprising a set of instructions that, in response to being executed on a computing device, cause the computing device to:
    send a probe request message from a service seeker;
    receive a probe response message in response to the probe request message, the probe response message to identify an advertised service and comprise a Wi-Fi Direct Services (WFDS) application service platform (ASP) capability attribute; and
    determine whether to use a WFDS ASP connection setup procedure to establish a connection with an advertiser of the advertised service, based on the WFDS ASP capability attribute of the advertiser and a WFDS ASP capability attribute of the service seeker.

11. The at least one non-transitory computer-readable medium of claim 10, comprising instructions that, in response to being executed on the computing device, cause the computing device to establish a connection with the advertiser using the WFDS ASP connection setup procedure in response to a determination that the WFDS ASP capability attribute of the advertiser and a WFDS ASP capability attribute of the service seeker specified in the probe request message indicate that the advertiser and the service seeker, respectively, are capable of performing the WFDS ASP connection setup procedure.

12. The at least one non-transitory computer-readable medium of claim 10, the WFDS ASP capability attribute of the advertiser comprising a value indicating whether the advertiser is capable of performing a WFDS ASP session setup procedure, the WFDS ASP capability attribute of the service seeker comprising a value indicating whether the service seeker is capable of performing the WFDS ASP session setup procedure.

13. The at least one non-transitory computer-readable medium of claim 12, comprising instructions that, in response to being executed on the computing device, cause the computing device to establish a session with the advertiser using the WFDS ASP session setup procedure in response to a determination that the WFDS ASP capability attribute of the advertiser and the WFDS ASP capability attribute of the service seeker indicate that the advertiser and the service seeker, respectively, are capable of performing the WFDS ASP session setup procedure.

14. The at least one non-transitory computer-readable medium of claim 12, comprising instructions that, in response to being executed on the computing device, cause the computing device to bypass the WFDS ASP session setup procedure in response to a determination that the WFDS ASP capability attribute of the advertiser indicates that the advertiser is not capable of performing the WFDS ASP session setup procedure.

15. The at least one non-transitory computer-readable medium of claim 10, the WFDS ASP capability attribute of the advertiser further comprising a value indicating whether the advertiser is capable of performing a WFDS ASP session teardown procedure, the WFDS ASP capability attribute of the service seeker further comprising a value to indicate whether the service seeker is capable of performing the WFDS ASP session teardown procedure.

16. The at least one non-transitory computer-readable medium of claim 15, comprising instructions that, in response to being executed on the computing device, cause the computing device to terminate a session with the advertiser using the WFDS ASP session teardown procedure in response to a determination that the WFDS ASP capability attribute of the advertiser indicates that the advertiser is capable of performing the WFDS ASP session teardown procedure.

17. The at least one non-transitory computer-readable medium of claim 10, the probe request message specifying a second WFDS ASP capability attribute comprising a value indicating whether the service seeker is capable of performing a WFDS ASP session setup procedure, the at least one non-transitory computer-readable medium further comprising instructions that, in response to being executed on the computing device, cause the computing device to:
bypass the WFDS ASP connection setup procedure in response to a determination that the WFDS ASP capability attribute of a first one of the service seeker and the advertiser indicates that the first one of the service seeker and the advertiser is not capable of performing the WFDS ASP connection setup procedure; and
establish a Wi-Fi Direct peer-to-peer (P2P) link-layer connection between the service seeker and the advertiser.

18. A method, comprising:
sending a probe request message from a service seeker;
receiving a probe response message in response to the probe request message, the probe response message to identify an advertised service and comprise a Wi-Fi Direct Services (WFDS) application service platform (ASP) capability attribute; and
determining, by a processor circuit, whether to use a WFDS ASP connection setup procedure to establish a connection with an advertiser of the advertised service, based on the WFDS ASP capability attribute of the advertiser and a WFDS ASP capability attribute of the service seeker.

19. The method of claim 18, the probe request message comprising a value indicating that the service seeker is capable of performing the WFDS ASP connection setup procedure, the method further comprising establishing a connection with the advertiser using the WFDS ASP connection setup procedure in response to a determination that the WFDS ASP capability attribute of the advertiser and the WFDS ASP capability attribute of the service seeker indicate that the advertiser and the service seeker, respectively, are capable of performing the WFDS ASP connection setup procedure.

20. The method of claim 18, the WFDS ASP capability attribute of the advertiser comprising a value indicating whether the advertiser is capable of performing a WFDS ASP session setup procedure, the WFDS ASP capability attribute of the service seeker comprising a value indicating whether the service seeker is capable of performing the WFDS ASP session setup procedure.

21. The method of claim 20, comprising establishing a session with the advertiser using the WFDS ASP session setup procedure in response to a determination that the WFDS ASP capability attribute of the advertiser and the WFDS ASP capability attribute of the service seeker indicate that the advertiser and the service seeker, respectively, are capable of performing the WFDS ASP session setup procedure.

22. The method of claim 20, comprising bypassing the WFDS ASP session setup procedure in response to a determination that the WFDS ASP capability attribute of the advertiser indicates that the advertiser is not capable of performing the WFDS ASP session setup procedure.

23. The method of claim 18, the WFDS ASP capability attribute of the advertiser further comprising a value indicating whether the advertiser is capable of performing a WFDS ASP session teardown procedure, the WFDS ASP capability attribute of the service seeker comprising a value indicating whether the service seeker is capable of performing the WFDS ASP session teardown procedure.

24. The method of claim 23, comprising terminating a session with the advertiser using the WFDS ASP session teardown procedure in response to a determination that the WFDS ASP capability attribute of the advertiser indicates that the advertiser is capable of performing the WFDS ASP session teardown procedure.

25. The method of claim 18, the probe request message specifying a second WFDS ASP capability attribute comprising a value indicating whether the service seeker is capable of performing a WFDS ASP session setup procedure, the method further comprising:
bypassing the WFDS ASP connection setup procedure in response to a determination that the WFDS ASP capability attribute of a first one of the service seeker and the advertiser indicates that the first one of the service seeker and the advertiser is not capable of performing the WFDS ASP connection setup procedure; and
establishing a Wi-Fi Direct peer-to-peer (P2P) link-layer connection between the service seeker and the advertiser.

* * * * *